United States Patent [19]

Breitenfellner

[11] 4,429,004

[45] Jan. 31, 1984

[54] LIGHT-REFLECTING BODY

[75] Inventor: Franz Breitenfellner, 6140 Bensheim, Fed. Rep. of Germany

[73] Assignee: Ciba-Geigy Corporation, Ardsley, N.Y.

[21] Appl. No.: 273,800

[22] Filed: Jun. 15, 1981

[30] Foreign Application Priority Data

Jun. 26, 1980 [CH] Switzerland ............... 4913/80

[51] Int. Cl.³ .................. B32B 5/16; B32B 15/08; F21V 7/22; G02B 5/08
[52] U.S. Cl. .................... 428/324; 350/288; 350/292; 362/341; 428/325; 428/323; 428/328; 428/458; 523/172; 524/420; 524/423; 524/447; 524/449; 524/451; 524/456; 524/605
[58] Field of Search ............. 428/458, 328, 323, 324, 428/325; 523/172; 524/605, 447, 449, 451, 456, 420, 423; 362/341; 350/288, 292

[56] References Cited

U.S. PATENT DOCUMENTS

| | | | |
|---|---|---|---|
| 4,111,893 | 9/1978 | Gasman | 524/605 |
| 4,116,925 | 9/1978 | Brachman | 524/605 |
| 4,211,689 | 7/1980 | Borman | 524/605 |

FOREIGN PATENT DOCUMENTS

| | | |
|---|---|---|
| 2532066 | 2/1976 | Fed. Rep. of Germany . |
| 2438102 | 2/1976 | Fed. Rep. of Germany . |
| 2524121 | 12/1976 | Fed. Rep. of Germany . |
| 2719429 | 11/1978 | Fed. Rep. of Germany . |
| 2910643 | 10/1979 | Fed. Rep. of Germany . |
| 2017127 | 10/1979 | United Kingdom . |

OTHER PUBLICATIONS

Ca, 85, 47662n (1976)
Ca, 84, 18261e (1976)

*Primary Examiner*—Ellis P. Robinson
*Attorney, Agent, or Firm*—Luther A. R. Hall

[57] ABSTRACT

A light-reflecting body, in particular a car headlight, whose wall consists of a poly-(1,4-butylene terephthalate) which contains 10–60% by weight of a filler, having a particle size of at most 30 μm, chosen from the group comprising kaolin, talc, mica, wollastonite, glass beads, zinc sulfide, lithopone, calcium sulfate and barium sulfate, onto which wall is applied a light-reflecting metal layer, if necessary over a previously applied lacquer layer.

4 Claims, No Drawings

LIGHT-REFLECTING BODY

The present invention relates to light-reflecting bodies, such as headlights or mirrors, whose wall consists of a polyester, based on poly-(1,4-butylene terephthalate), containing finely divided fillers, a light-reflecting metal layer being applied to at least one surface of the wall, if appropriate over a lacquer layer.

Light-reflecting bodies made from thermoplastics and used, for example, as headlights are required to meet high standards in respect of deformation resistance and shock resistance, since, during use, the parabolic construction of the headlight can result in relatively high temperatures, and after use major fluctuations in temperature can arise. The headlights described in German Offenlegungsschrift No. 2,910,643 do not fully conform to these requirements. It has now been found that headlights whose wall consists of a polyester based on poly-(1,4-butylene terephthalate) and containing a finely divided filler conform to the required standards.

The present invention relates to a light-reflecting body whose wall consists of poly-(1,4-butylene terephthalate) or of a copolyester based on 1,4-butylene terephthalate, in each case containing 10–60% by weight of finely divided fillers, a reflecting metal layer being applied to at least one surface of the wall, either direct or on top of a lacquer layer, in which body the filler has a particle size of not more than 30 μm and is selected from the group comprising kaolin, talc, mica, wollastonite, glass beads, zinc sulfide, lithopone, calcium sulfate and barium sulfate. The lower limit of particle size is about 0.5 μm.

Poly-(1,4-butylene terephthalate) is a commercial polyester. Copolyesters based on poly-(1,4-butylene terephthalate) are to be understood as meaning those in which up to 25 mol %, and preferably up to 15 mol %, relative to the polyester, of the terephthalic acid radicals or butylene glycol radicals have been replaced by other dicarboxylic acid radicals or diol radicals.

Examples of dicarboxylic acids which can be used as co-components are linear or branched aliphatic dicarboxylic acids, such as succinic acid, glutaric acid, adipic acid, trimethyladipic acid, dodecylsuccinic acid, azelaic acid and dimeric acids (dimerisation products of unsaturated $C_{10}$–$C_{20}$-fatty acids), cycloaliphatic dicarboxylic acids, such as cyclohexane-1,4-dicarboxylic acid and aromatic dicarboxylic acids, such as isophthalic acid and diphenyl-4,4'-dicarboxylic acid. Examples of diols which can be used as co-components are linear or branched aliphatic diols, such as ethylene glycol, 1,2- or 1,3-propylene glycol, pentylene glycol and neopentyl glycol, cycloaliphatic diols, such as cyclohexane-1,3-diol, cyclohexane-1,4-diol and 1,4-(dihydroxymethyl)-cyclohexane, aromatic diols, such as bisphenols, especially 2,2-bis-(p-hydroxyphenyl)-propane, 2,2-bis-(3,5-dibromo-4-hydroxyphenyl)-propane and corresponding β-hydroxyethylated derivatives, and diols containing N,N-heterocyclic rings, for example N,N'-(2-hydroxyethyl)-5,5-dimethyl-hydantoin, N,N'-(2-hydroxyethyl)-benzimidazolone and N,N'-(2-hydroxyethyl)-4,5,6,7-tetrabromobenzimidazolone.

Since an increasing amount of filler can entail a lowering of surface quality, it is preferred to employ 10–40% by weight, and especially 10–30% by weight, of the selected fillers. High surface quality, especially as regards smoothness, is highly desirable in order to obtain a flawless reflecting surface after direct application of a light-reflecting metal layer. If the surface quality is less good, a lacquer layer can first be applied, followed by a metal layer.

The particle size of the selected fillers is preferably less than 20 μm and in particular less than 15 μm. Particularly good results in respect of well-balanced mechanical properties and surface properties are obtained if the mean particle size is between 5 and 15 μm.

Especially preferred fillers are kaolin, glass beads, talc and mica. The fillers can be used with or without adhesion promoters.

The light-reflecting bodies according to the invention can be constructed as convex (for example parabolic), concave or plane mirrors. A particularly preferred field of use is in headlights for motor vehicles which in respect of light reflection, luminosity and life are comparable with conventional metal headlights. The wall thickness of the bodies can be 0.5 to 5 mm.

The bodies according to the invention can be produced by the conventional industrial injection-moulding processes from appropriately filled moulding materials which can contain other conventional additives, such as lubricants or stabilisers. The mould temperatures can be about 20° to 120° C. and the cylinder temperatures 240°–270° C.

After the wall has been moulded, and after a lacquer layer has, if necessary, been applied, the side of the body which is to be the mirror is provided with a metal layer, which can be done by conventional methods, for example by vapour deposition of aluminium.

The examples which follow explain the invention in more detail.

EXAMPLE 1

A moulding material which consists of 70% by weight of poly-(1,4-butylene terephthalate) (PBT) having an intrinsic viscosity of 0.9 dl/g, and 30% by weight of glass beads having a mean particle size of 9 μm is injection-moulded at a cylinder temperature of 250° C. and a mould temperature of 90° C., with a cycle time of 45 seconds, to give a parabolic moulding having a wall thickness of 2.5 mm, a depth of 65 mm and an orifice diameter of 170 mm. The body is provided with a mirror coating by vacuum metallisation with aluminium. The reflector obtained has a smooth surface, with uniform reflectance.

EXAMPLE 2

A reflector is prepared, in accordance with Example 1, from a PBT (intrinsic viscosity 0.95 dl/g) which contains 30% by weight of glass beads having a particle size of 3–30 μm. The mould temperature is 80° C. The surface properties of the reflector are comparable with those of the reflector according to Example 1.

EXAMPLE 3

Reflectors are prepared, according to Example 1, from the following moulding materials:
 (a) 85% by weight of PBT (intrinsic viscosity 0.9 dl/g) 15% by weight of kaolin (mean particle size 2 μm)
 (b) 70% by weight of PBT 30% by weight of kaolin
 (c) 55% by weight of PBT 45% by weight of kaolin
 (d) 40% by weight of PBT 60% by weight of kaolin.
The reflectors made from moulding materials (a) and (b) are comparable, in respect of their surface properties, with the reflector according to Example 1. The reflectors produced from moulding materials (c) and (d) must be provided with a lacquer layer in order to achieve equivalent surface properties.

What is claimed is:

1. A light-reflecting body having a wall and a reflecting metal layer on at least one surface of the wall either directly or on top of the lacquer layer, said wall consisting of
   (a) 90–70% by weight of poly(1,4-butylene terephthalate) or a copolyester based on 1,4-butylene terephthalate, and
   (b) 10–30% by weight of a finely divided filler which is kaolin or mica, and wherein the filler has a particle size of not more than 30 microns.

2. A body according to claim 1 wherein component (a) is poly(1,4-butylene terephthalate).

3. A body according to claim 1, wherein the filler is kaolin.

4. A body according to claim 3, which contains 20–30% by weight of kaolin.

* * * * *